United States Patent
Nicolas et al.

(10) Patent No.: US 6,924,791 B1
(45) Date of Patent: Aug. 2, 2005

(54) METHOD AND APPARATUS FOR AUTOMATIC POWER-UP AND POWER-DOWN OF A COMPUTER SYSTEM BASED ON THE POSITIONS OF AN ASSOCIATED STYLUS AND/OR HINGE

(75) Inventors: Regis Nicolas, Jacou (FR); Neal Osborn, Milpitas, CA (US)

(73) Assignee: palmOne, Inc., Santa Clara, CA (US)

( * ) Notice: Subject to any disclaimer, the term of this patent is extended or adjusted under 35 U.S.C. 154(b) by 0 days.

(21) Appl. No.: 09/522,274

(22) Filed: Mar. 9, 2000

(51) Int. Cl.⁷ ................................................. G09G 5/00
(52) U.S. Cl. ..................... 345/179; 345/173; 178/18.01; 178/18.09
(58) Field of Search ................................. 345/156, 158, 345/169, 173, 174–179, 905; 178/18.01, 18.03, 19.01, 19.05, 18.1, 18.2, 18.4–18.7, 19.06, 20.01

(56) References Cited

U.S. PATENT DOCUMENTS

| | | | |
|---|---|---|---|
| 4,897,873 A | | 1/1990 | Beutler et al. ............... 379/433 |
| 5,049,862 A | * | 9/1991 | Dao et al. .................... 340/706 |
| 5,067,573 A | * | 11/1991 | Uchida ........................ 345/173 |
| 5,117,073 A | | 5/1992 | Mischenko ................. 200/61.7 |
| 5,179,502 A | * | 1/1993 | Matsuda ...................... 361/680 |
| 5,278,993 A | | 1/1994 | Reiff et al. .................... 455/90 |
| 5,483,262 A | * | 1/1996 | Izutani ........................ 345/156 |
| 5,584,054 A | * | 12/1996 | Tyneski et al. ............... 455/89 |
| 5,615,259 A | | 3/1997 | Gilbert ........................ 379/433 |
| 5,646,649 A | * | 7/1997 | Iwata et al. ................. 345/173 |
| 5,750,939 A | * | 5/1998 | Makinwa et al. ........ 178/18.01 |
| 5,756,941 A | * | 5/1998 | Snell ............................ 178/18 |
| 5,845,161 A | * | 12/1998 | Schrock et al. ............. 396/313 |
| 5,889,888 A | * | 3/1999 | Marianetti, II et al. ..... 382/187 |
| 5,894,580 A | * | 4/1999 | Yoshida .................. 395/750.08 |
| 6,100,538 A | * | 8/2000 | Ogawa .................... 250/559.29 |
| 6,233,464 B1 | * | 5/2001 | Chmaytelli .............. 455/556.2 |
| 6,246,577 B1 | * | 6/2001 | Han et al. .................... 361/686 |
| 6,392,639 B1 | * | 5/2002 | Lee et al. .................... 345/179 |

\* cited by examiner

*Primary Examiner*—Bipin Shalwala
*Assistant Examiner*—Mansour M. Said
(74) *Attorney, Agent, or Firm*—Wagner, Murabito & Hao LLP

(57) ABSTRACT

A method and system for automatic power-up and automatic power-down of a computer system based on the position and/or rotation of an associated stylus and/or hinge. In one embodiment, the computer system is a portable computer having a logic board, a display screen, a digitizer and a receiving slot for an associated stylus. When the stylus is removed from the receiving slot, a switch automatically turns full power onto the computer system thereby allowing a user full use of the computer without requiring an on/off button to be pressed. When the stylus is inserted back into the receiving slot, the switch automatically returns the computer to a power reduction mode where one or all of the components of the computer are powered down. Again, the power reduction mode is entered without requiring the user to press the on/off button. The switch can be made of a single detector or a dual detector combination and can be of a mechanical, electromagnetic, optical or electrical nature. In another embodiment, the stylus-based automatic power-up and power-down features work in concert with other power-up and power-down mechanisms of the computer, such power-on interrupts, the on/off button, and time-out power off modes. In another embodiment, the stylus is a hinge attached to a cover that can be rotated to protect the computer or rotated away to use the computer. When rotated to cover, the switch automatically powers down the computer. When rotated out for computer use, the switch automatically powers up the computer.

15 Claims, 17 Drawing Sheets

METHOD AND APPARATUS FOR AUTOMATIC POWER-UP AND POWER-DOWN OF A COMPUTER SYSTEM BASED ON THE POSITIONS OF AN ASSOCIATED STYLUS AND/OR HINGE

BACKGROUND OF THE INVENTION

1. Field of the Invention

The present invention relates to the field of computer systems that utilize a digitizer and stylus. More specifically, the present invention relates to power-on and power-off mechanisms for portable computer systems that utilize a digitizer and an associated stylus or that have a cover.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." Most palmtop computer systems are used to implement various Personal Information Management (PIM) applications such as an address book, a daily organizer and electronic notepads, to name a few. Palmtop computers with PIM software have been know as Personal Digital Assistants (PDAs).

Data entry on a palmtop computer has been a challenge. Since palmtop computer systems are very small, full-sized keyboards are generally not efficient input devices. Palmtop computers using keyboards have keyboard devices that are so small that a user cannot touch-type. Furthermore, to use a keyboard device, a user must either place the palmtop computer system down onto a flat surface, so the user can type with both hands, or the user holds the palmtop computer system with two hands and types with thumbs only.

Instead of a mechanical keyboard device, some palmtop computers utilize a touch screen and display an image of a small keyboard thereon. When a particular button is pressed or tapped, a small keyboard image is displayed on the display screen. The user then interacts with the on-screen small keyboard image to enter characters, usually one character at a time. To interact with the displayed keyboard image (e.g., "virtual keyboard"), the user taps the screen location of a character with a pen or stylus. That corresponding character is then recognized and added to a data entry field, also displayed on the screen. However, for experienced users, the virtual keyboard input system can be a tedious input process.

Instead of using a mechanical keyboard device or a displayed keyboard, many palmtop computers employ a pen and a digitizer pad as an input system. The pen and digitizer pad combination works well for palmtop computers because the arrangement allows a user to hold the palmtop computer system in one hand while writing with the pen onto the digitizer pad with the other hand.

A number of palmtop computer systems that rely on the pen and digitizer pad combination as the primary means of input have been introduced to the market. Most of these pen-based palmtop computer systems provide some type of handwriting recognition system whereby the user can write words and letters on the digitizer pad with a stylus. The palmtop computer system then converts the user's handwriting into a machine readable format such as ASCII code characters. Examples of pen-based palmtop computer systems that provide handwriting recognition include the Apple Newton (trademark) device and the Tandy Zoomer (trademark) device.

Digitizers have eliminated the need for a mechanical keyboard device. Therefore, palmtop computer systems are readily portable and can easily be carried on or near the user, e.g., in a pocket, purse or briefcase. Since they can be carried by a user, the user has many opportunities to use the palmtop computer during the day. Since the palmtop computer is typically battery operated, it is recommended to turn off the computer at the completion of each separate use. As such, each time the palmtop is used, an on/off button is typically pressed to turn on power to the computer system, including the display device. Therefore, each time the palmtop computer is to be used, the on/off button is pressed and after use the on/off button is pressed again to turn off the palmtop computer. The more times the computer is used, the more times the on/off button needs to be pressed to gain access to the palmtop computer. If the palmtop computer is being used merely to access (or amend or transmit) a small bit of information and then turned off, the process of pressing the on/off button twice can be a substantial amount of the user's task just to obtain or amend the desired information thereby rendering tedious the use of the computer.

Users always want easier ways and mechanisms to access information on the palmtop computer. Any improvement that reduces the user's repetitive tasks in obtaining information and making use of a palmtop computer system is open to wide consumer acceptance. Therefore, it would be advantageous to make easier and less tedious the user's tasks in accessing information from a palmtop computer system.

SUMMARY OF THE INVENTION

Accordingly, what is needed is an improvement that reduces the number of repetitive tasks required of a user in order to obtain information and make use of a palmtop computer system. What is needed is a method and system that reduces the repetitive tasks required in turning on and turning off the palmtop computer system. The present invention provides these advantages and others not specifically mentioned above but described in the sections to follow.

A method and system are described for automatic power-up and automatic power-down of a computer system based on the position and/or rotation of an associated stylus and/or hinge. In one embodiment, the computer system is a portable computer having a logic board, a display screen, a digitizer and a receiving slot for an associated stylus. The stylus is used with the digitizer in well known character recognition modes. When the stylus is removed from the receiving slot, a switch automatically turns full power onto the computer system thereby allowing a user full use of the computer without requiring an on/off button to be pressed. When the stylus is inserted back into the receiving slot, the switch automatically returns the computer to a power reduction mode where one or all of the components of the computer are powered down. Again, the power reduction mode is entered without requiring the user to press the on/off button. The switch can be made of a single detector or a dual detector combination and can be of a mechanical, electromagnetic, optical, inductive, capacitive or electrical nature. The switch and detector can also be implemented using a microswitch device. By using the position of the stylus to automatically perform power on and off functions, the repetitive tasks required to access information from the palmtop are reduced.

In another embodiment, the stylus-based automatic power-up and power-down features work in concert with other power-up and power-down mechanisms of the computer, such power-on interrupts, the on/off button, and time-out power off modes. In another embodiment, the stylus is a hinge attached to a cover that can be rotated to protect the palmtop computer (like a book cover) or rotated away to use the palmtop computer (like opening a book). When rotated to cover, the switch automatically powers down the computer. When rotated out for computer use, the switch automatically powers up the computer. By using the position of the hinge to automatically perform power up and down functions, the repetitive tasks required to access information from the palmtop are reduced.

More specifically, an embodiment of the present invention includes a computer system comprising: a processor coupled to bus; a memory unit coupled to the bus; a display screen coupled to the bus; a digitizer coupled to the bus; a case for supporting the processor, the memory unit, the display screen and the digitizer, the case having a slot located therein for receiving a stylus; a detector for detecting a stylus within said slot; and a switch coupled to the detector and for generating a signal to power up the processor, the display screen and the digitizer when the stylus is removed from the slot and wherein the switch is also for generating a signal to place the processor, the display screen and the digitizer into a power conservation mode when the stylus is inserted into the slot. Embodiments include a power on and power off method implemented in accordance with the above.

Embodiments also include a computer system comprising: a processor coupled to bus; a memory unit coupled to the bus; a display screen coupled to the bus; a digitizer coupled to the bus; a case for supporting the processor, the memory unit, the display screen and the digitizer, the case having a slot located therein for receiving a hinge attached to a protective cover; a detector for detecting the rotational positions of the hinge within the slot; a switch coupled to said detector and for generating a signal to automatically power up the processor, the display screen and the digitizer when the hinge is rotated such that the cover is not laid over the display screen and wherein the switch is also for generating a signal to automatically place the processor, the display screen and the digitizer into a power conservation mode when the hinge is rotated such that the cover is laid over the display screen.

DETAILED DESCRIPTION OF THE INVENTION

In the following detailed description of the present invention, a method and system for automatically powering-up and automatically powering-down a computer system based on the position and/or rotation of an associated stylus, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

Figure 1:
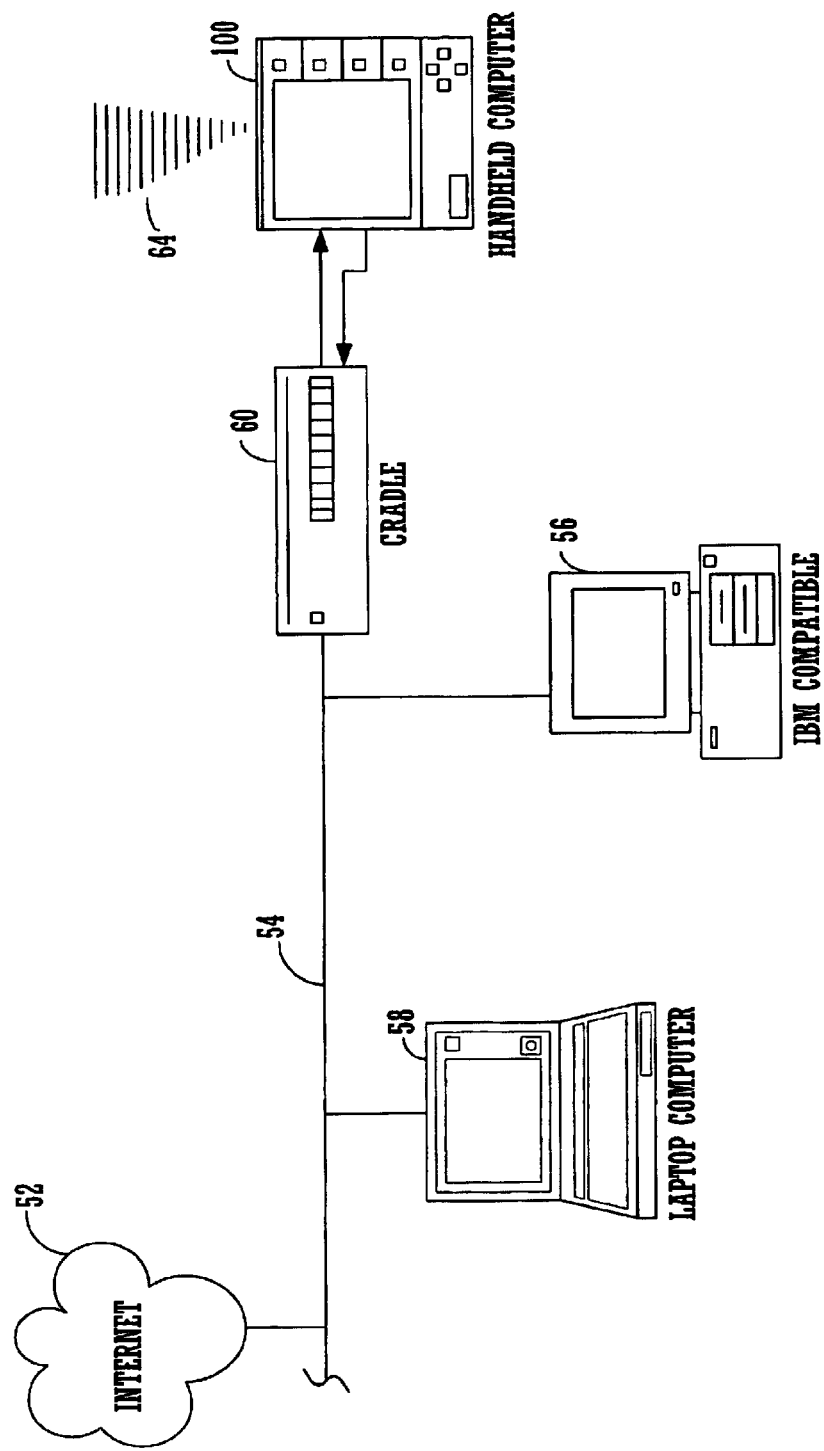
FIG. 1 is system illustration of a palmtop or "palm sized" computer system connected to other computer systems and the Internet via a cradle device.

FIG. 1 illustrates a system 50 that can be used in conjunction with the automatic power on and power off features of the present invention. System 50 comprises a host computer system 56 which can either be a desktop unit as shown, or, alternatively, can be a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a palm top ("palm-sized") portable computer system 100 of the present invention. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 2A:
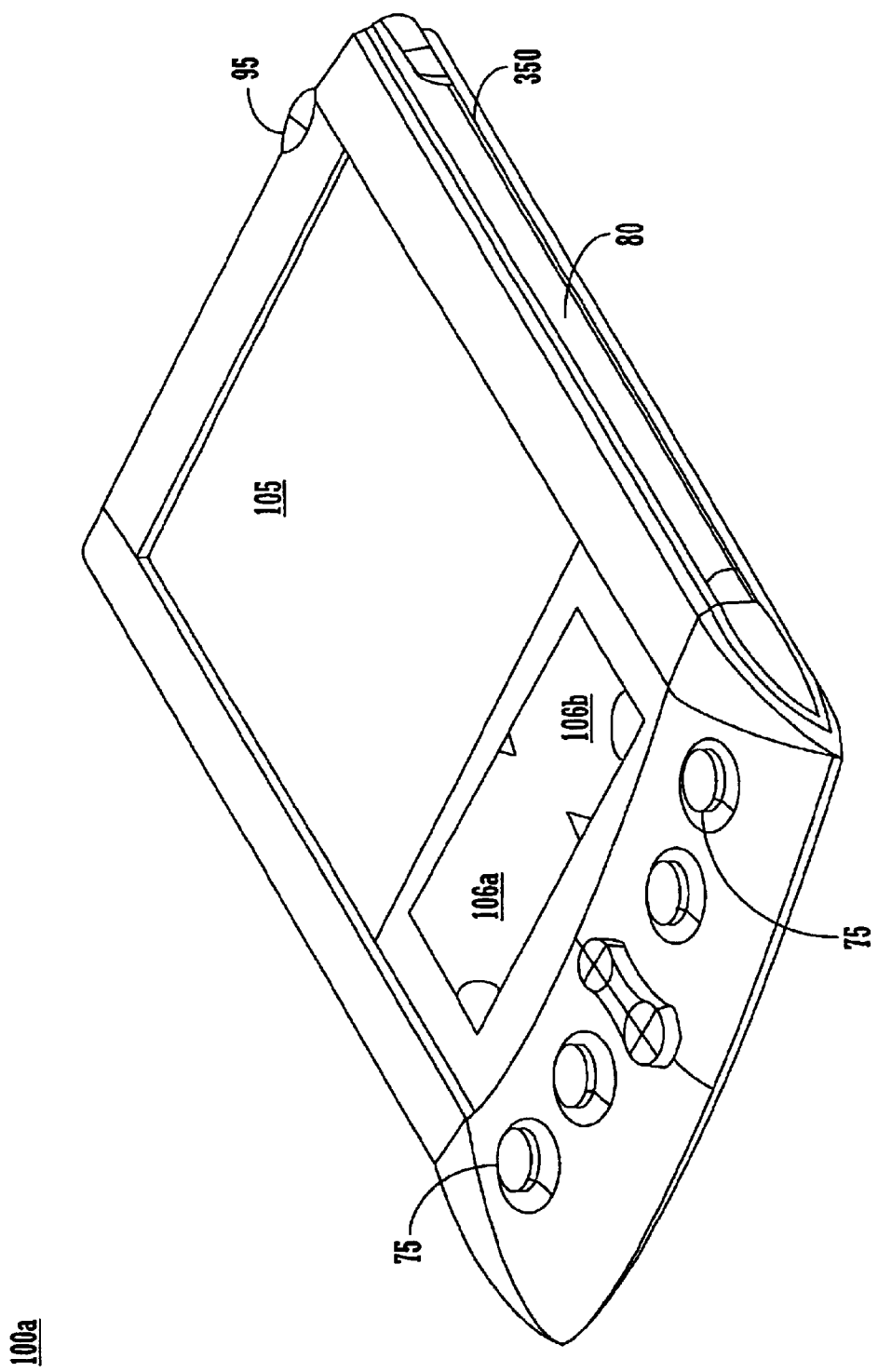
FIG. 2A is a top side perspective view of a palmtop computer system that can be used as a platform for the automatic power-up and power-down embodiments of the present invention.

FIG. 2A is a perspective illustration of the top face 100a of one embodiment of the palmtop computer system of the present invention. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105. As shown in FIG. 2A, the stylus 80 is inserted into a receiving slot or rail 350. Slot or rail 350 acts to hold the stylus when the computer system 100a is not in use. As described more fully below, slot or rail 350 also contains switching devices for automatically powering down and automatically power up computer system 100a based on the position of the stylus 80. The top face 100a also contains one or more dedicated and/or programmable buttons 75 for selecting information and causing the computer system to implement functions. The on/off button 95 is also shown.

FIG. 2A also illustrates a handwriting recognition pad or "digitizer" containing two regions 106a and 106b. Region 106a is for the drawing of alpha characters therein for automatic recognition (and generally not used for recognizing numeric characters) and region 106b is for the drawing of numeric characters therein for automatic recognition (and generally not used for recognizing alpha characters). The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 5:
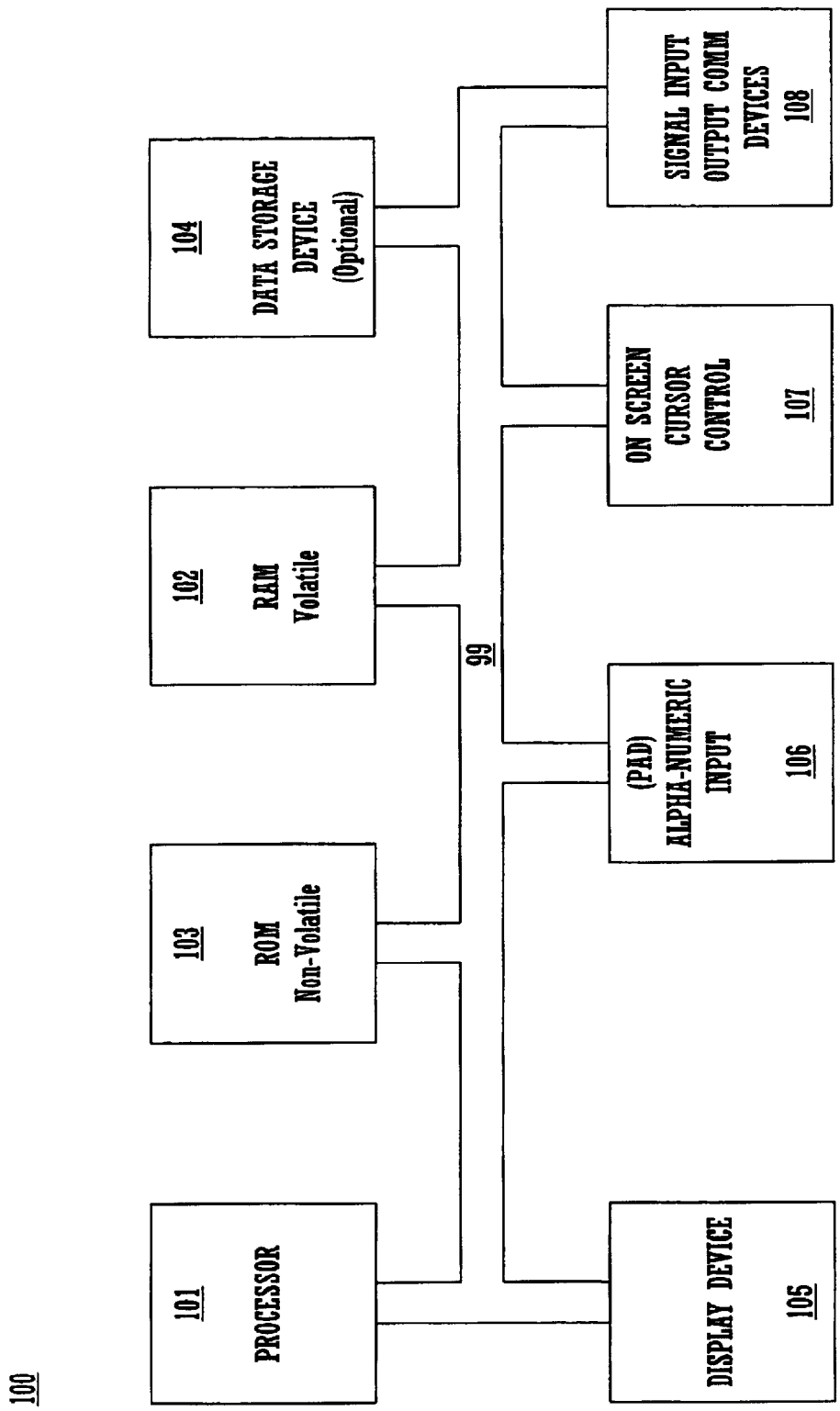
FIG. 5 is a logical block diagram of the palmtop computer system in accordance with an embodiment of the present invention.

The digitizer 160 records both the (x, y) coordinate value of the current location of the stylus and also simultaneously records the pressure that the stylus exerts on the face of the digitizer pad. The coordinate values (spatial information) and pressure data are then output on separate channels for sampling by the processor 101 (FIG. 5). In one implementation, there are roughly 256 different discrete levels of pressure that can be detected by the digitizer 106. Since the digitizer's channels are sampled serially by the processor, the stroke spatial data are sampled "pseudo" simultaneously with the associated pressure data. The sampled data is then stored in a memory by the processor 101 (FIG. 5) for later analysis.

Figure 2B:
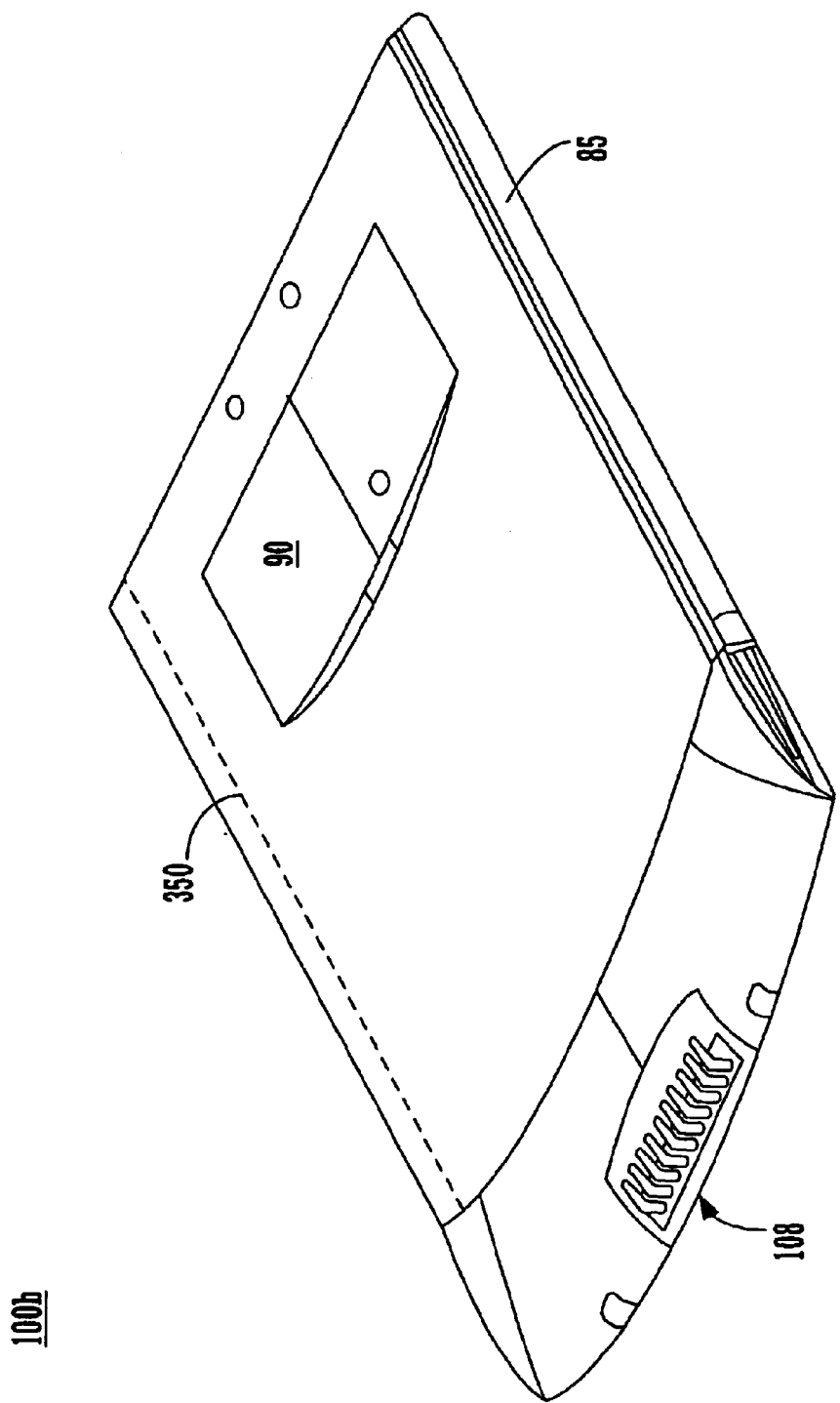
FIG. 2B is a bottom side perspective view of the palmtop computer system of FIG. 2A.

FIG. 2B illustrates the bottom side 100b of one embodiment of the palmtop computer system of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc. In FIG. 2B is also shown the stylus receiving slot or rail 350.

Figure 3:
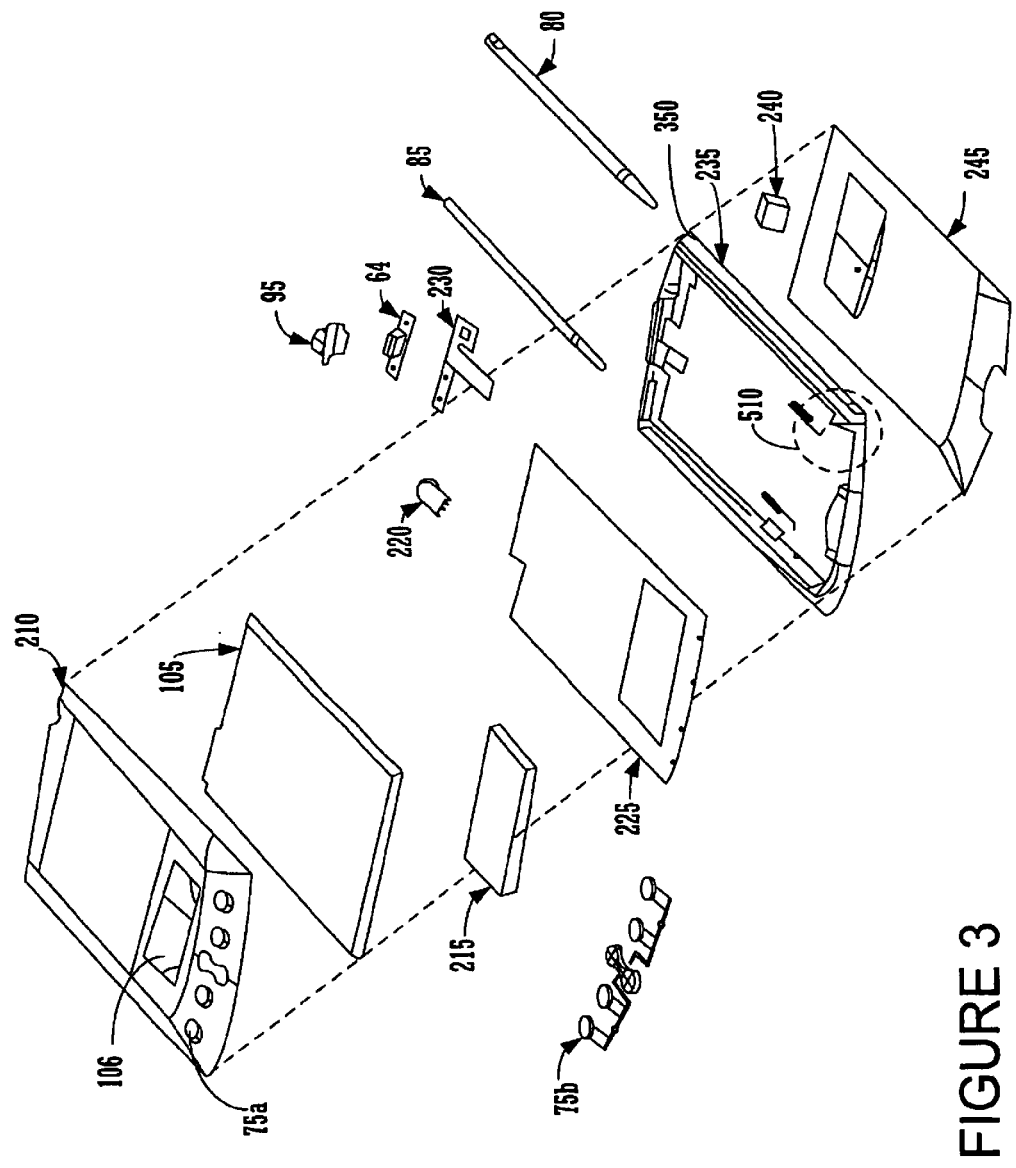
FIG. 3 is an exploded view of the components of the palmtop computer system of FIG. 2A.

FIG. 3 is an exploded view of the palmtop computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. The touch screen can be a digitizer. A battery 215 provides electrical power. The digitizer can be implemented using well known devices, for instance, using the ADS-7846 device by Burr-Brown that provides separate channels for spatial stroke information and pressure information. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is shown. The midframe 235 contains the stylus receiving slot or rail 350 and also anchors the automatic power on and automatic power off switch devices. The automatic power on and automatic power off switch devices of the present invention are located in region 510, in one embodiment.

A radio receiver/transmitter device 240 is also shown between the midframe and the rear cover 245 of FIG. 3. The receiver/transmitter device 240 is coupled to the antenna 85 and also coupled to communicate with the PC board 225. In one implementation, the Mobitex wireless communication system is used to provide two way communication between system 100 and other networked computers and/or the Internet via a proxy server. In other embodiments, TCP protocol can be used.

Figure 4:
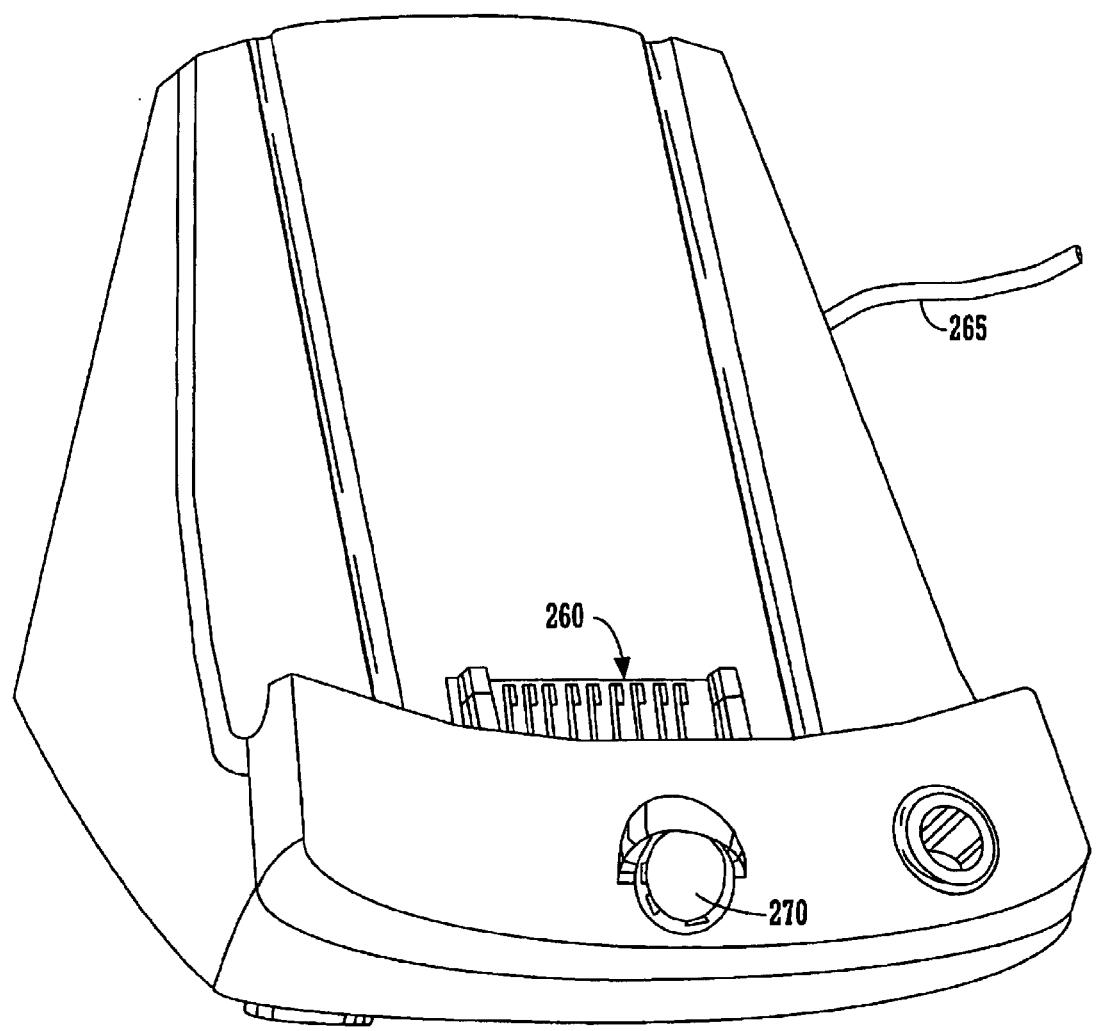
FIG. 4 is a perspective view of the cradle device for connecting the palmtop computer system to other systems via a communication interface.

FIG. 4 is a perspective illustration of one embodiment of the cradle 60 for receiving the palmtop computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 13:
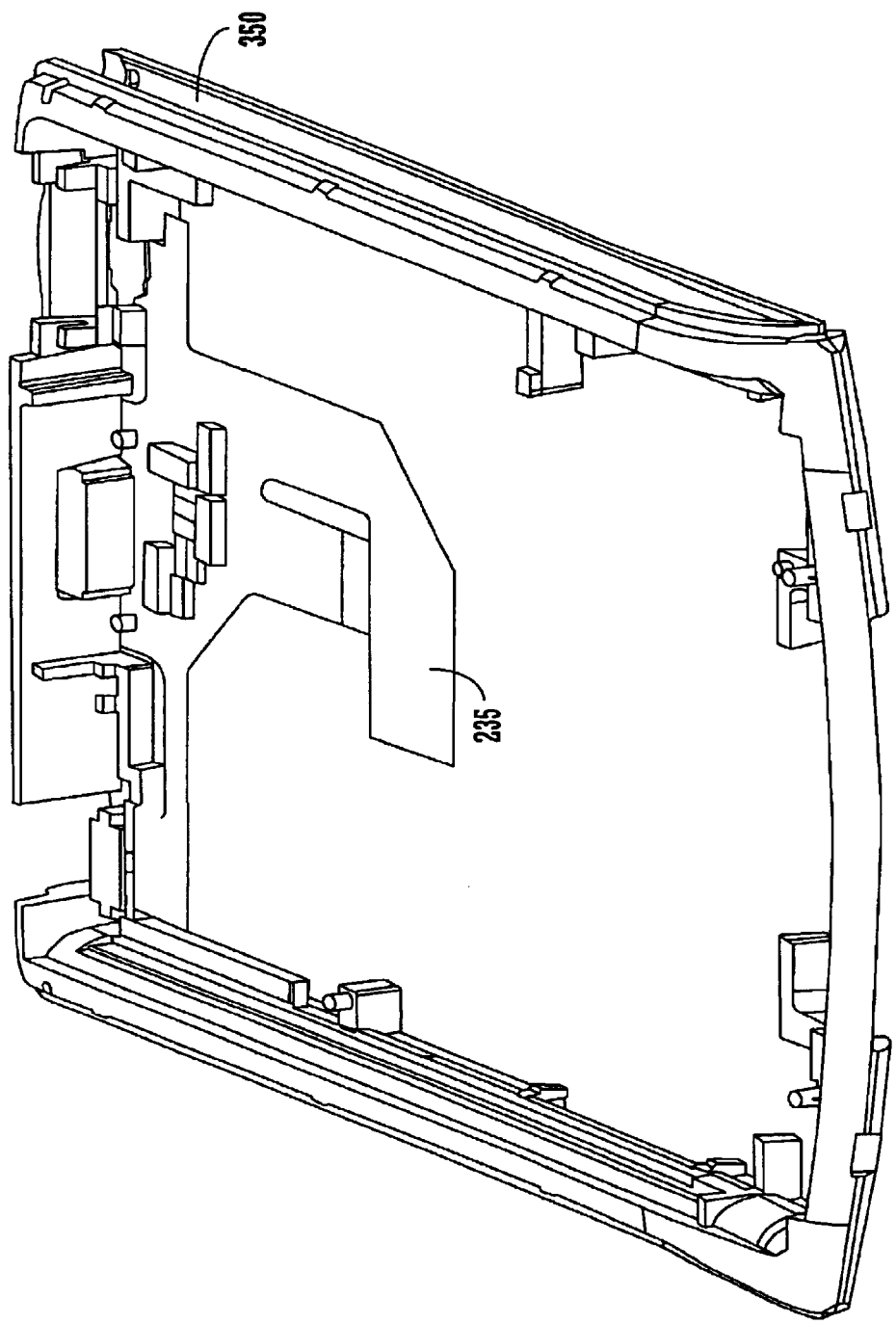
FIG. 13 illustrates a casing used in one embodiment of the present invention having a slot (or rail) for receiving a stylus or a cover hinge.
Figure 14:
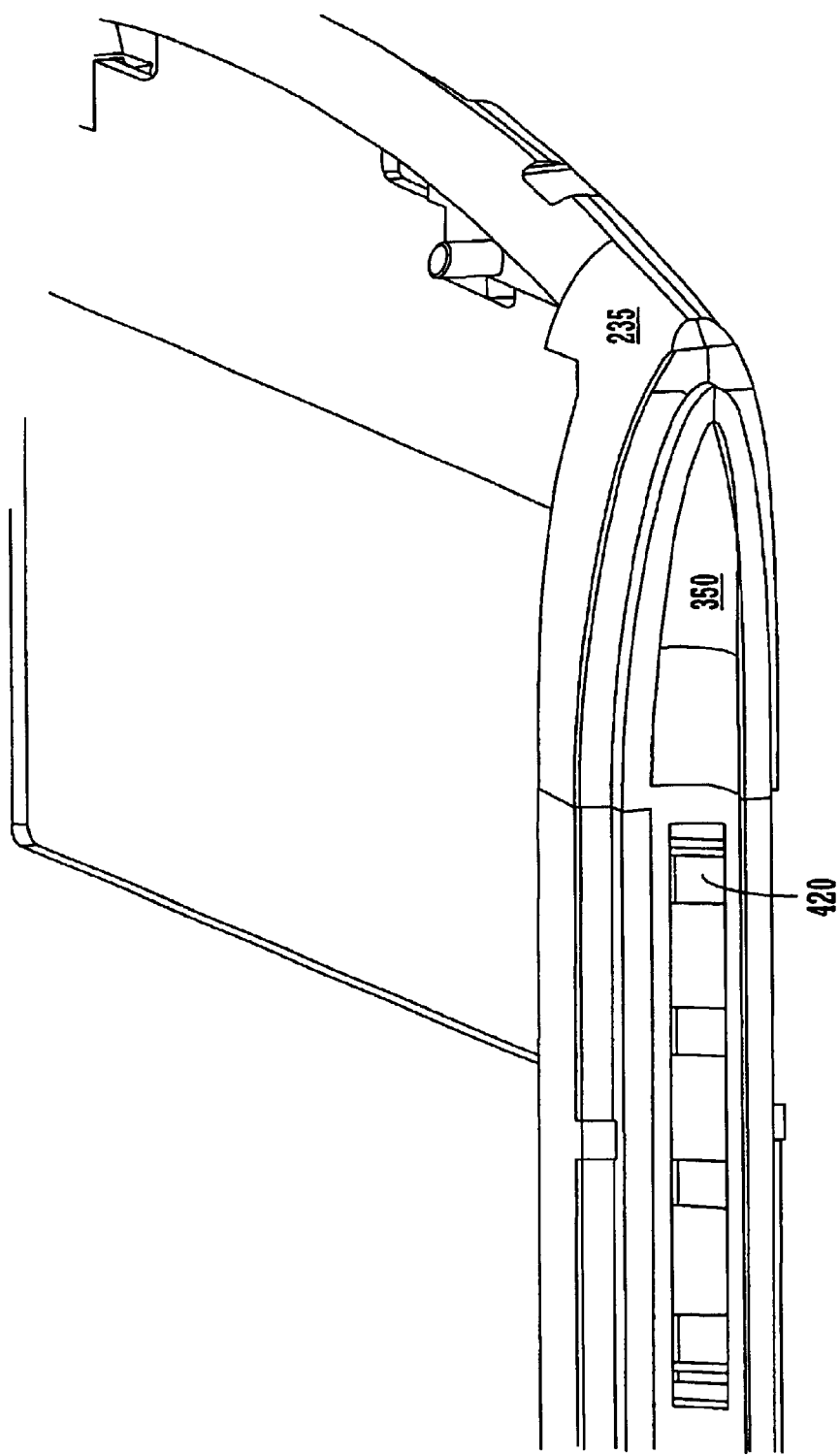
FIG. 14 illustrates the slot (or rail) for receiving a stylus or a cover hinge and also illustrates a detector element in the slot.

FIG. 5 illustrates circuitry of computer system 100, some of which can be implemented on PC board 225. The computer system 100 can be used to perform character recognition processes and authentication of the present invention, e.g., processes 600 and 640 (FIG. 13A and FIG. 13B) and process 650 (FIG. 14). Computer system 100 includes an address/data bus 99 for communicating information, a central processor 101 coupled with the bus 99 for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 110 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 110 of FIG. 5 is an alphanumeric input device 106 which in one implementation is a handwriting recognition pad ("digitizer") having regions 106a and 106b (FIG. 2A), for instance. Device 106 can communicate information (spatial data and pressure data) and command selections to the central processor 101. System 110 also includes an optional cursor control or directing device 107 coupled to the bus for communicating user input information and command selections to the central processor 101. In one implementation, device 107 is a touch screen device incorporated with screen 105. Device 107 is capable of registering a position on the screen 105 where the stylus makes contact and the pressure of the contact. The display device 105 utilized with the computer system 110 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Each of the devices shown in FIG. 5 receives power from a battery device or other voltage source. This power can be interrupted via a switch device. In one embodiment, the switch is controlled by power on/off button 95 (FIG. 3). When the switch is in power off mode, the devices of FIG. 5 are disabled except for the RAM 102 which continues to receive power to maintain the volatile data. When the switch is on, power is restored to all of the devices of FIG. 5. As described in more detail below, in the present invention, the switch can be controlled by the position of stylus 80 with respect to a receiving slot and/or by the rotation of a cover hinge within the receiving slot.

Figure 6:
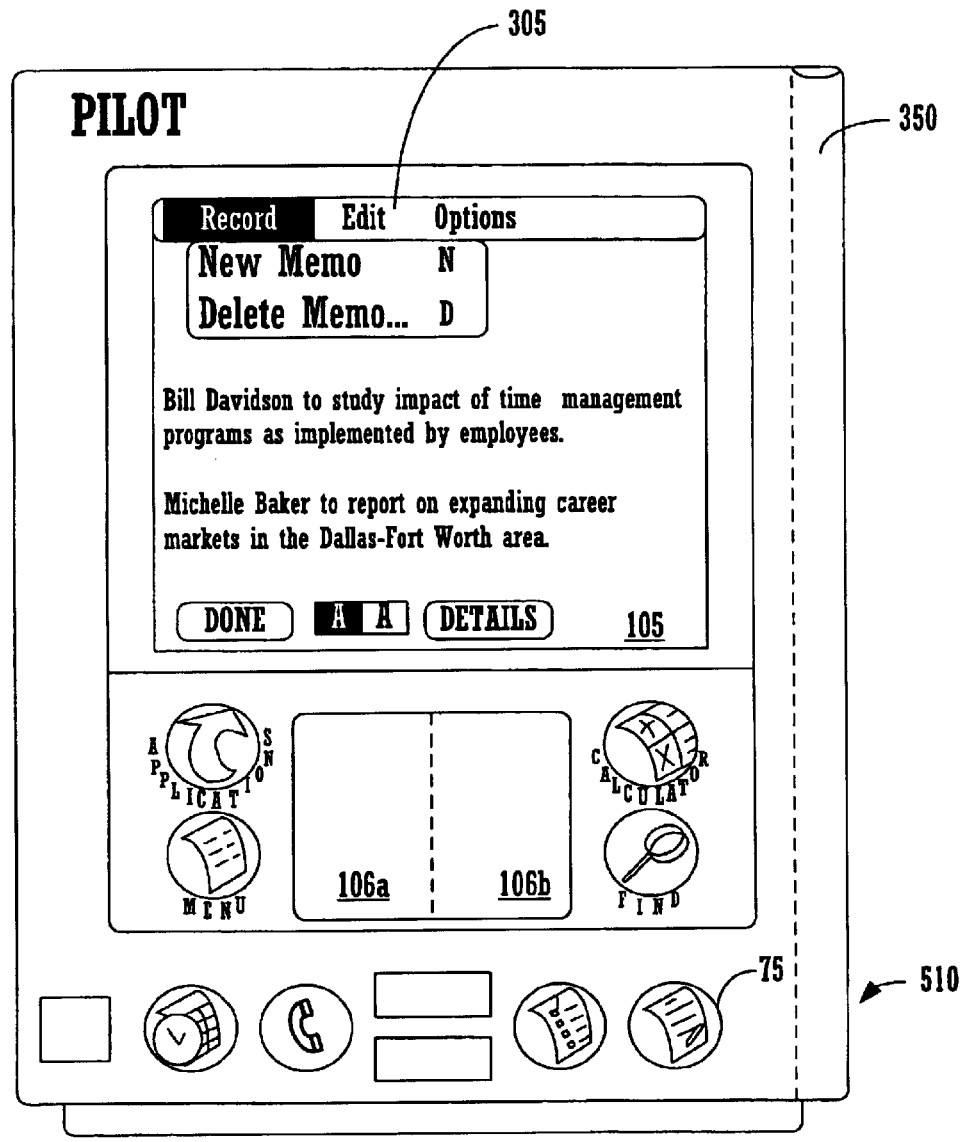
FIG. 6 is a front view of a palm top computer system illustrating the display screen, digitizer regions and an exemplary menu of a text display application.

FIG. 6 is a front view of the palmtop computer system 100 with a menu bar 305 open displaying a pull down window having several selections that can be made by the user. Buttons on screen 105 can be selected by the user directly tapping on the screen location of the button with stylus 80.

Also shown are two regions of digitizer 106a and 106b. Region 106a is for receiving user stroke data (and pressure data) for alphabet characters, and typically not numeric characters, and region 106b is for receiving user stroke data (and pressure data) for numeric data, and typically not for alphabetic characters. Physical buttons 75 are also shown. Although different regions are shown for alphabetic and numeric characters, the present invention is also operable within a single region that recognizes both alphabetic and numeric characters. Also shown in FIG. 6 is the position of the stylus receiving slot or rail 350. It is appreciated that while the stylus receiving slot or rail 350 is depicted on the left of the computer 100, it can also be deployed on the right or along the top edge or along the bottom edge.

It is appreciated that, in one embodiment, the digitizer region 106a and 106b is separate from the display screen 105 and therefore does not consume any display area.

Automatic Power On and Automatic Power Off Using the Position of a Stylus and/or Cover Hinge In accordance with embodiments of the present invention the electronics of FIG. 5 are selectively placed into various power modes in response to a switch circuit. However, in one embodiment, the RAM 102 is dynamic RAM and is constantly refreshed to maintain the volatile data regardless of the power mode of the remainder of computer 100. For instance, in the full power or "power-up" mode, each of the electronic devices receives (consumes) nominal power from a voltage source (e.g., a battery). In a power conservation mode, also called "power down" mode, certain electronic devices receive less than their nominal power in order to conserve power. The power conservation mode also includes the scenario where the electronics devices are fully powered off, except for RAM 102. The devices are commanded to be in either the power-up mode or the power-down mode by a mode signal generated by a switch circuit in accordance with the present invention.

Figure 7:
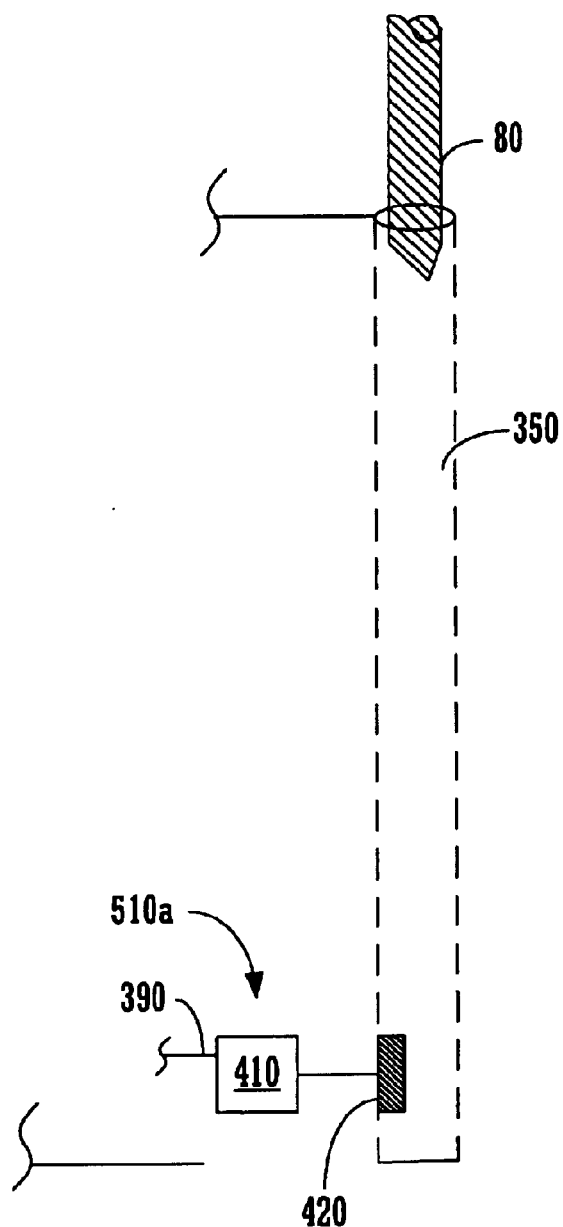
FIG. 7 is a cross section of a stylus receiving slot incorporated within the casing of the portable computer system of an embodiment of the present invention and having a single proximity detector element.

FIG. 7 illustrates a cut away cross sectional view of the stylus receiving slot or rail 350 of one embodiment of the present invention 510a. FIG. 7 also illustrates a switch device 410 that generates a mode signal over line 390. The mode of the switch 410 is controlled by a detector device 420 and the modes are: stylus-in; and stylus out. Stylus in corresponds to power-down and stylus out corresponds to power-up. The detector device 420 is placed inside the stylus receiving slot or rail 350 that holds the stylus 80 when it is not in use. The detector device 420 is coupled to the switch circuit 410 and can be implemented, in one embodiment, as a microswitch. The devices of system 100 are commanded to be in either the power-up mode or the power-down mode by a mode signal generated by the switch circuit 410.

The stylus receiving slot or rail 350 is a part of the case 235 of the portable computer 100 (FIG. 3 and FIG. 6). According to this embodiment of the present invention, when the stylus 80 is inserted into slot 350 all the way, its presence becomes detected by detector 420 which generates a signal to switch 410. The switch 410 via control signal 390 controls the components of FIG. 5 (except the RAM) such that they are placed into a power conservation mode thereby causing computer system 100 to power down.

FIG. 14 illustrates a three dimensional perspective view of the detector 420 located within the slot 350 of the casing 235 in one embodiment of the present invention. In the example of FIG. 14, the slot is cut open on one side (the facing side) to expose part of the stylus (or cover hinge) but could alternatively be completely cylindrical in shape.

Alternatively, when the stylus 80 of FIG. 7 is removed from slot 350, its absence is detected by detector 420 which generates a signal to switch 410. The switch 410 via control signal 390 controls the voltage source such that power to the components of FIG. 5 is established thereby causing computer system 100 to power up for use. The user typically inserts the stylus 80 into slot 350 when he/she is done using computer 100 and the user typically removes the stylus 80 from slot 350 when he/she is ready to use computer 100. By using the location of stylus 80 as a tool for automatically powering up and powering down computer 100, the user does not have to press any on/off button 95. This embodiment of the present invention therefore reduces the number of repetitive tasks the user has to perform in order to use computer 100. It is appreciated that the detector device 420 can be implemented using a number of well known technologies for detecting the presence of an object, e.g., the detector device can be implemented as a mechanical detector device, an inductive device, a capacitive device, an optical detector device, an electrical device or an electromagnetic device.

Figure 8:
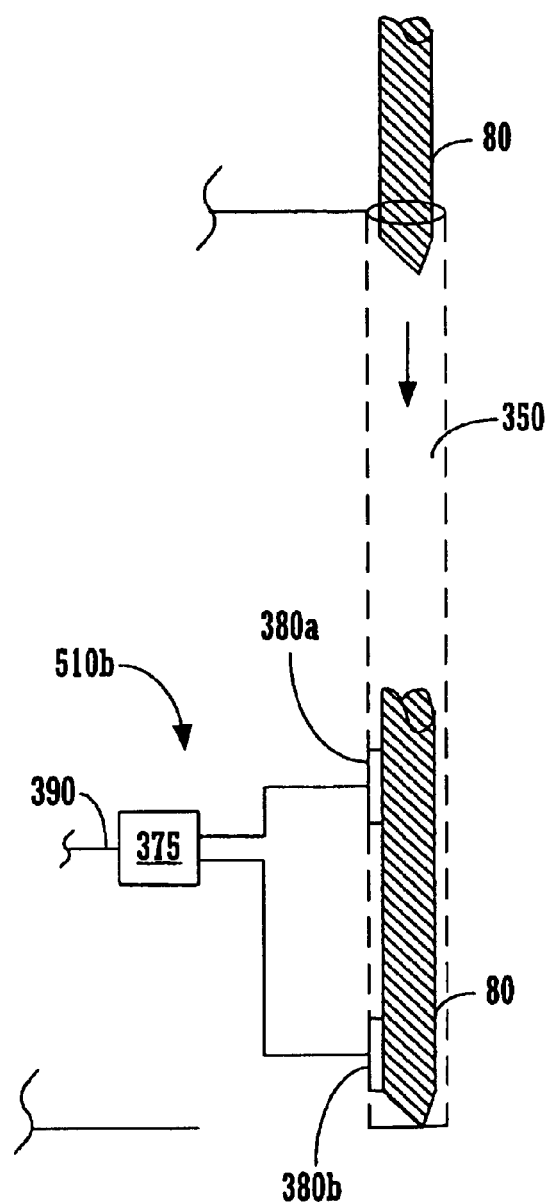
FIG. 8 is a cross section of a stylus receiving slot incorporated within the casing of the portable computer system of an embodiment of the present invention and having a pair of proximity detector elements.

FIG. 8 illustrates a cut away cross sectional view of the stylus receiving slot or rail 350 in accordance with another embodiment of the present invention 510b. In this embodiment, the detector device is implemented using two different detector elements 380a and 380b. In this embodiment, the detectors not only report that the stylus 80 has been inserted into slot 350 but also that the stylus 80 is in the process of being slid into or slid out of the slot 350. Both detector elements 380a and 380b are coupled to the switch circuit 375. The mode of the switch 375 is controlled by detector device 380a–380b and the basic modes are: stylus-in; and stylus out. Stylus in corresponds to power-down and stylus out corresponds to power-up. In one embodiment, the stylus 80 has a metal surface and when placed into slot 350, a circuit or connection is made through the stylus 80 between metal detectors 380a and 380b. This generates a signal to switch 375 which enters the power-down mode as represented by a mode signal over line 390.

It is appreciated that detectors 380a and 380b can also be implemented using optical detector elements, mechanical detector elements, inductive detector elements, magnetic (e.g., reed relay), capacitive detector elements or electromagnetic detector elements. It is further appreciated that the stylus detectors located with slot 350 can be implemented using the input/output (I/O) rail technology described in co-pending U.S. patent application Ser. No. 09/484,086, filed on Jan. 18, 2000, by Neal Osbom, Francis Canova, Jr. and Nicholas Twyman, entitled, "Connector for Handheld Computer," which is assigned to the assignee of the present invention and also hereby incorporated by reference.

Figure 9A:
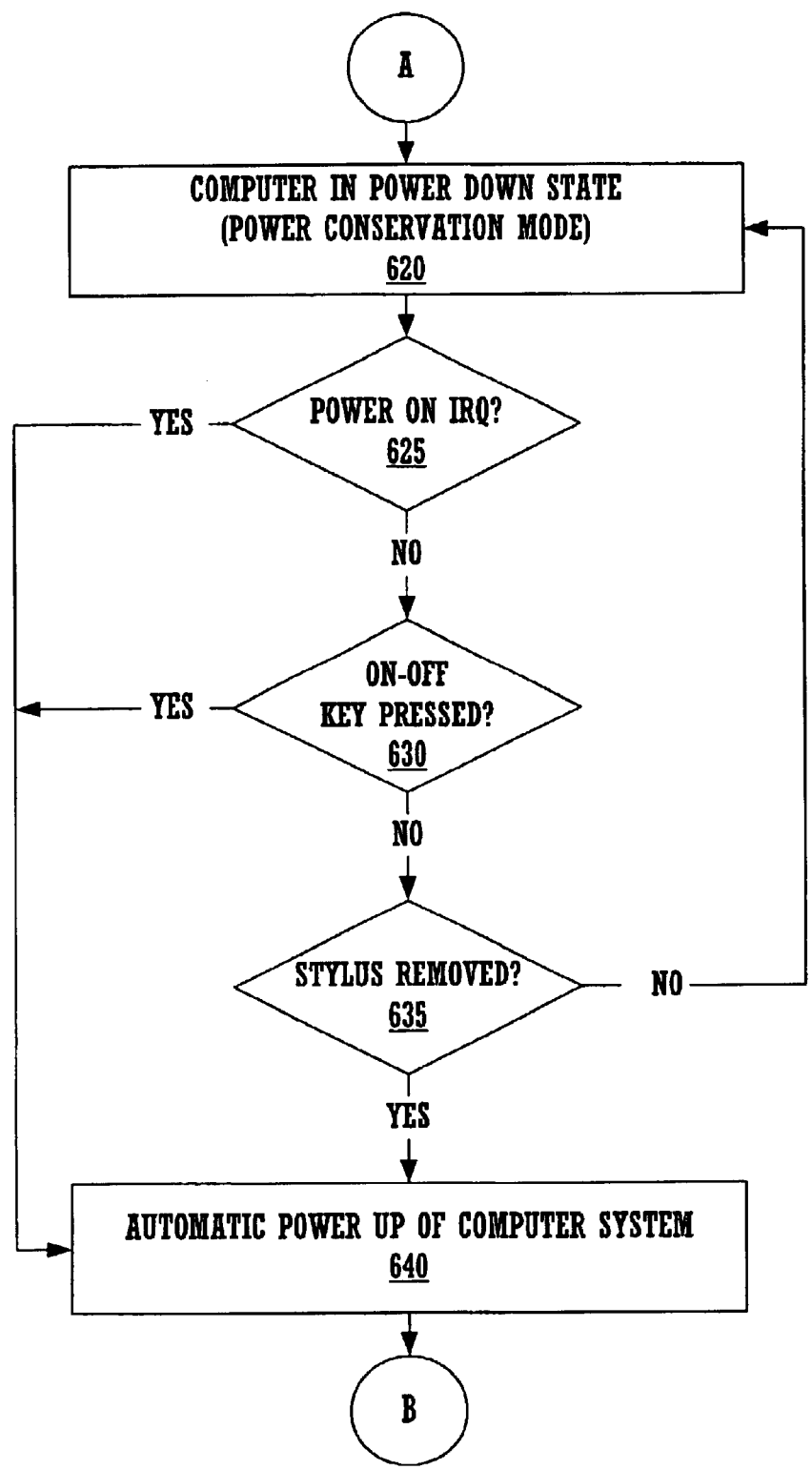
FIG. 9A and FIG. 9B are steps performed by an embodiment of the present invention for automatically powering-up and automatically powering-down a computer system based on the position of a stylus.
Figure 9B:
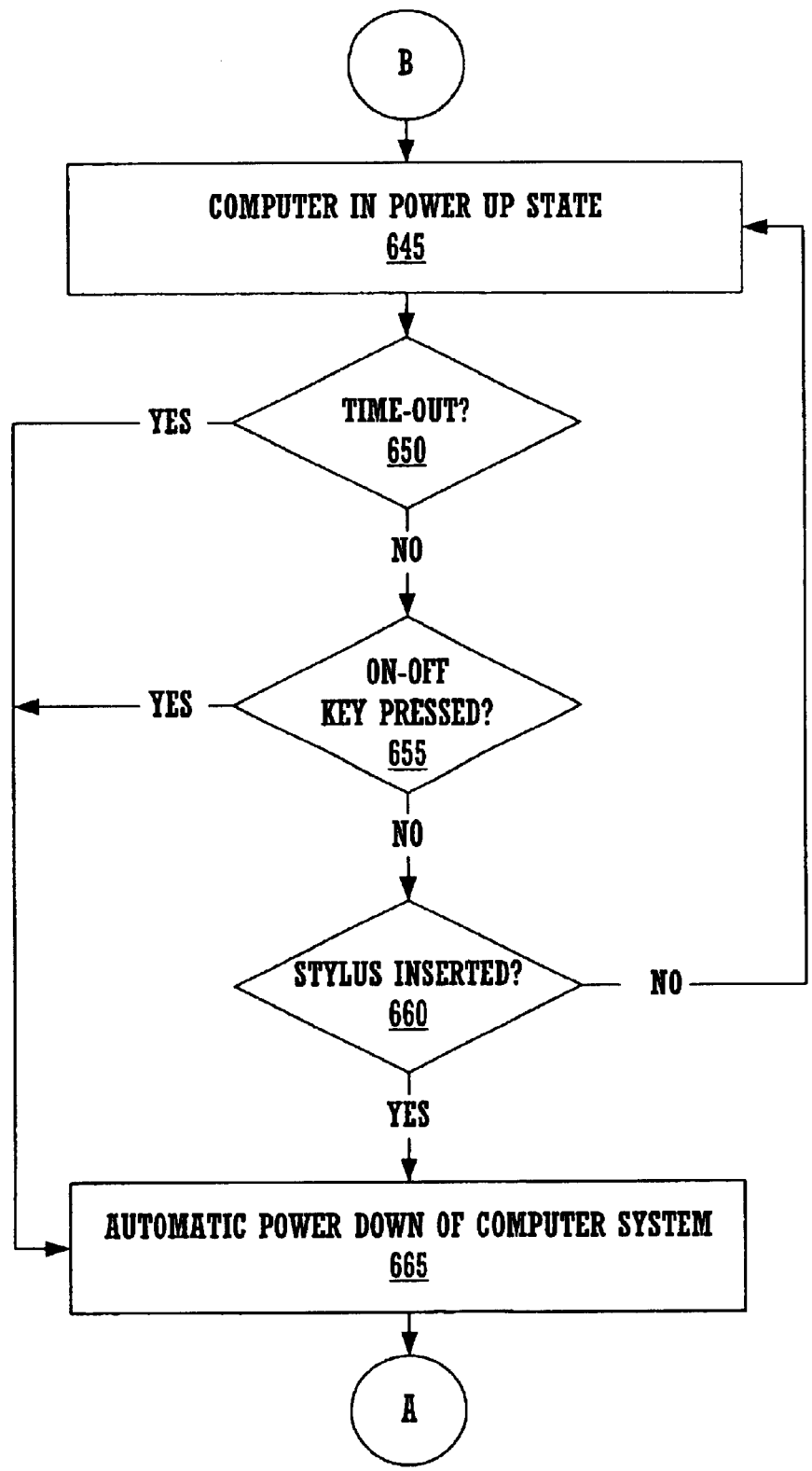

FIG. 9A and FIG. 9B illustrate the logical states of a power state machine 610 implemented in accordance with an embodiment of the present invention. It is appreciated that the mode signal generated at line 390 is only one piece of information that is used to either power-up or power-down the computer 100. At state 620, the computer 100 is in the power-down state, e.g., the devices of FIG. 5 are placed into a power conservation mode, except for the RAM 102 which continuously receives power. At step 625, if an interrupt is received by the computer 100, then state 640 is entered, otherwise state 630 is entered. At step 630, if the on/off key 95 is pressed, then state 640 is entered because the computer is currently in the power-down state, otherwise step 635 is entered. At step 635, if the switch (either 410 or 375) generates a mode signal over line 390 indicating that the stylus 80 has been removed from slot 350 then state 640 is entered, otherwise state 620 is entered.

At state 640, the computer 100 automatically is placed into the power-up state where nominal power is supplied to (consumed by) the devices of FIG. 5. At step 645 of FIG. 9B the computer remains in the power-up state. At step 650 of FIG. 9B, if a time-out occurs within computer 100, then state 665 is entered, otherwise state 655 is entered. A time-out occurs whenever no user activity is detected by computer 100 for a predetermined period of time. At step 655, if the on/off key 95 is pressed, then state 665 is entered because the computer is currently in the power-up state, otherwise step 660 is entered. At step 660, if the switch (either 410 or 375) generates a mode signal over line 390 indicating that the stylus 80 has been re-inserted into slot 350 then state 665 is entered, otherwise state 645 is entered.

At state 665 of FIG. 9B, the computer 100 automatically is placed into the power-down or power conservation state where all devices of FIG. 5 except for the RAM 102 device are placed into a power conservation mode. State 620 (FIG. 9A) is then entered again.

Figure 10:
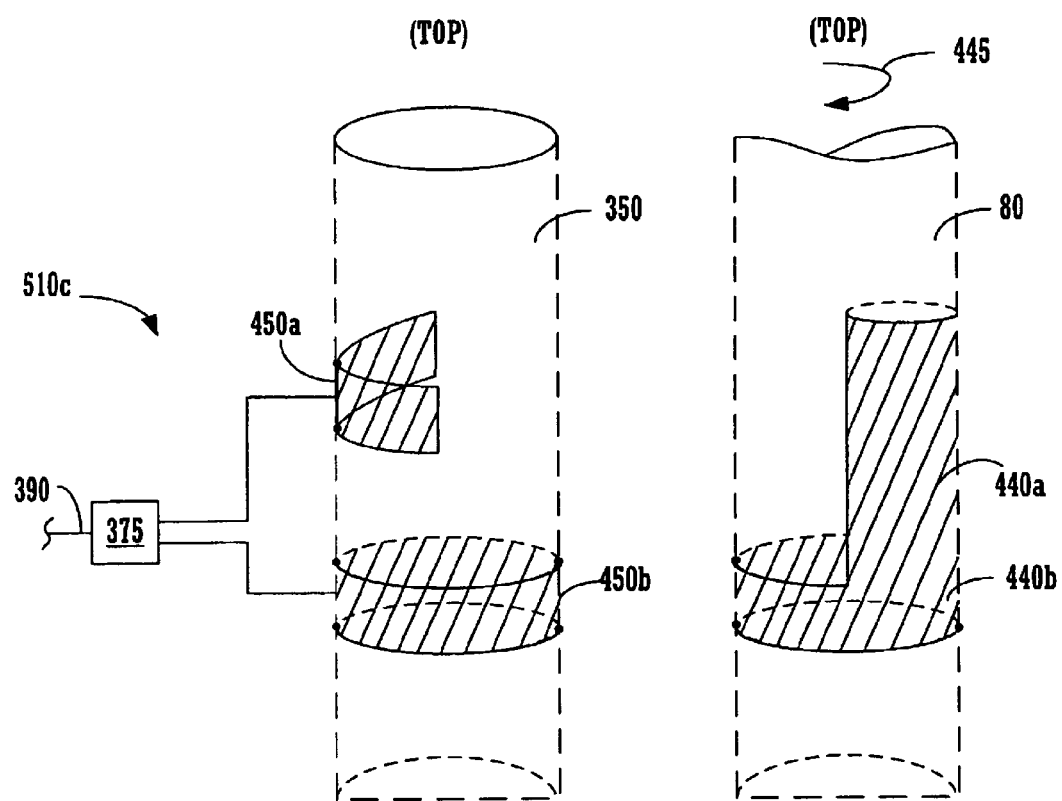
FIG. 10 illustrates a three dimensional view of a stylus receiving slot and a stylus for use in the hinge embodiment of the present invention.
Figure 11:
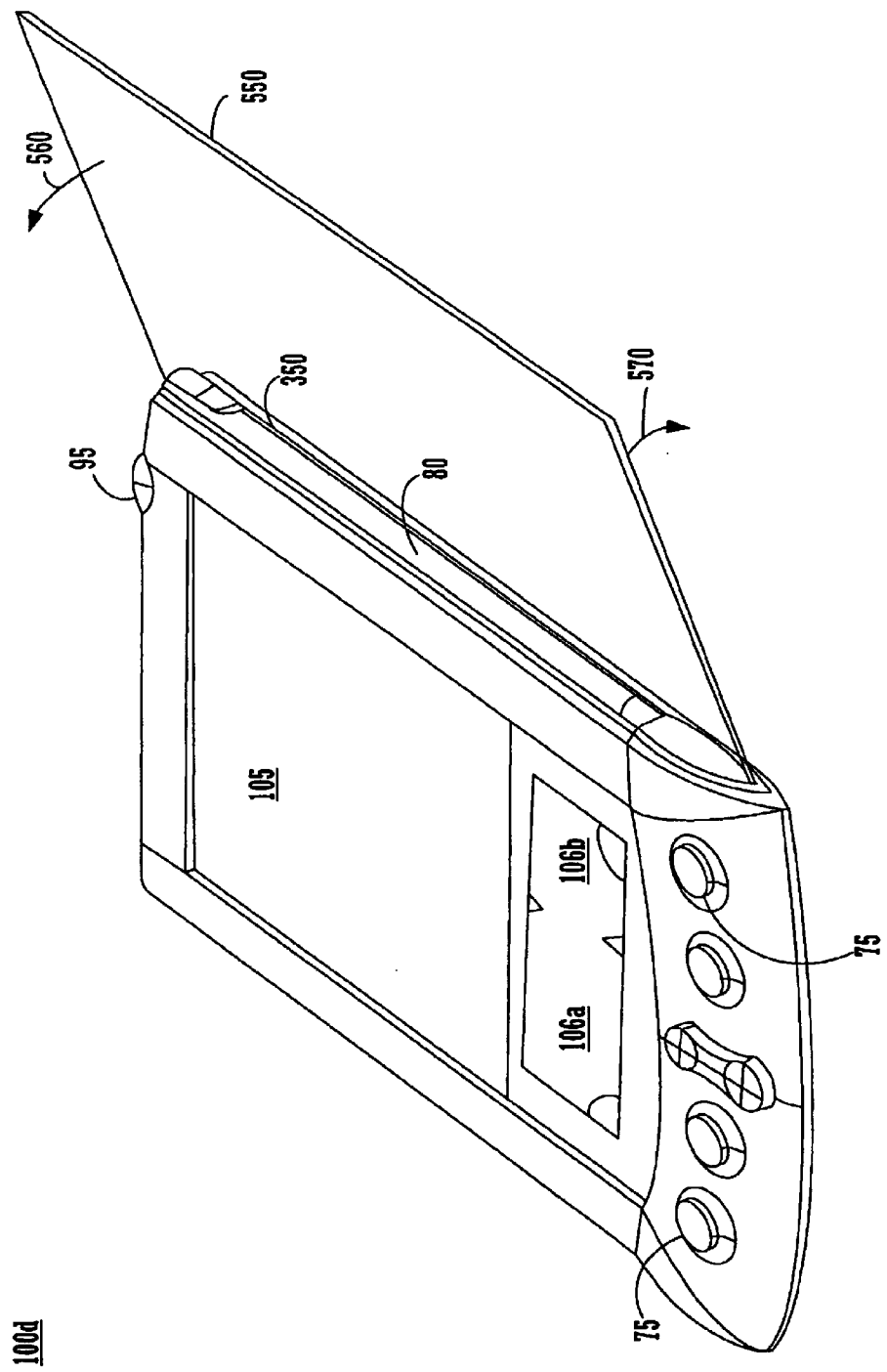
FIG. 11 illustrates a perspective view of the portable computer system with the hinge embodiment of the present invention.

FIG. 10–FIG. 12B illustrate the cover hinge embodiment of the present invention. In this embodiment, slot 350 can receive a stylus shaped device 80 that is also connected to a cover and thereby acts as a hinge for the cover. FIG. 11 illustrates a perspective view of the system 100d. The slot 350 is open in this embodiment (see also FIG. 13 and FIG. 14) and more closely resembles a rail thereby allowing the cover 550 to extend outside the rail 350 and rotate about the axis of the rail 350. When the cover rotates clockwise 570, the hinge 80 also rotates and the cover 550 is rotated away from display 105 so that the user can use the computer. Alternatively, when the cover 550 rotates counter-clockwise 560, the hinge 80 also rotates and the cover 550 is rotated such that it is laid over display 105 to protect the facing surface of computer 100 when the user is done working on the computer. The cover 550 can be made of leather or any soft protective surface material. It is appreciated that a stylus can be inserted into a slot (similar to rail 350) that runs along the left hand edge of system 100d.

In this embodiment, the hinge 80 is not generally removed from the rail 350 very often but it is rather rotated. Therefore, in accordance with this embodiment of the present invention, when the cover 550 is rotated counter-clockwise such that it is laid over screen 105, computer 100d automatically enters a power-down state. Alternatively, when cover 550 is rotated clockwise such that it does not lay over screen 105, computer 100d automatically enters a power-up state. It is appreciated that the hinge 80 can be located on the left or right side of computer 100d or it can be located on the top or bottom edge of computer 100d.

FIG. 10 illustrates a detector pair 450a and 450b that can be used to detect the rotational position of the hinge 80. On the surface of the hinge 80 is laid a circular "L" shaped metal tracing 440a and 440b. Region 440b is a ring shaped metal piece. Region 440a on the other hand does not extend all the way around hinge 80. Detector 450b is a metal detector that is ring shaped. Detector 450a is only semi-ring shaped, e.g., "C shaped," and does not extend all the away around rail 350. Although not shown in FIG. 10 for clarity, the left edge of cover 550 (FIG. 11) is connected to the right edge of hinge 80. When hinge 80 of FIG. 10 is in the position shown, but located inside rail 350, metal area 440b contacts metal detector 450b but metal area 440a does not contact metal detector 450a. Therefore, there is no electrical connection between detectors 450a and 450b. In this configuration, switch 375 then generates a power-up mode signal because the cover is in the open position, e.g., not laid over display 105. The devices of system 100 are commanded to be in either the power-up mode or the power-down mode by a mode signal generated by the switch circuit 375.

When hinge 80 is rotated clockwise 445 about ⅓ turn (e.g., the cover is closed and laid over display 105), metal area 440b contacts metal detector 450b and metal area 440a contacts metal detector 450a. Therefore, there is an electrical connection between detectors 450a and 450b. In this configuration, switch 375 then generates a power-down mode signal because the cover is in the closed position, e.g., laid over display 105. In this manner, switch 375 is able to detect the rotational position of hinge 80, and therefore of cover 550.

Figure 12A:
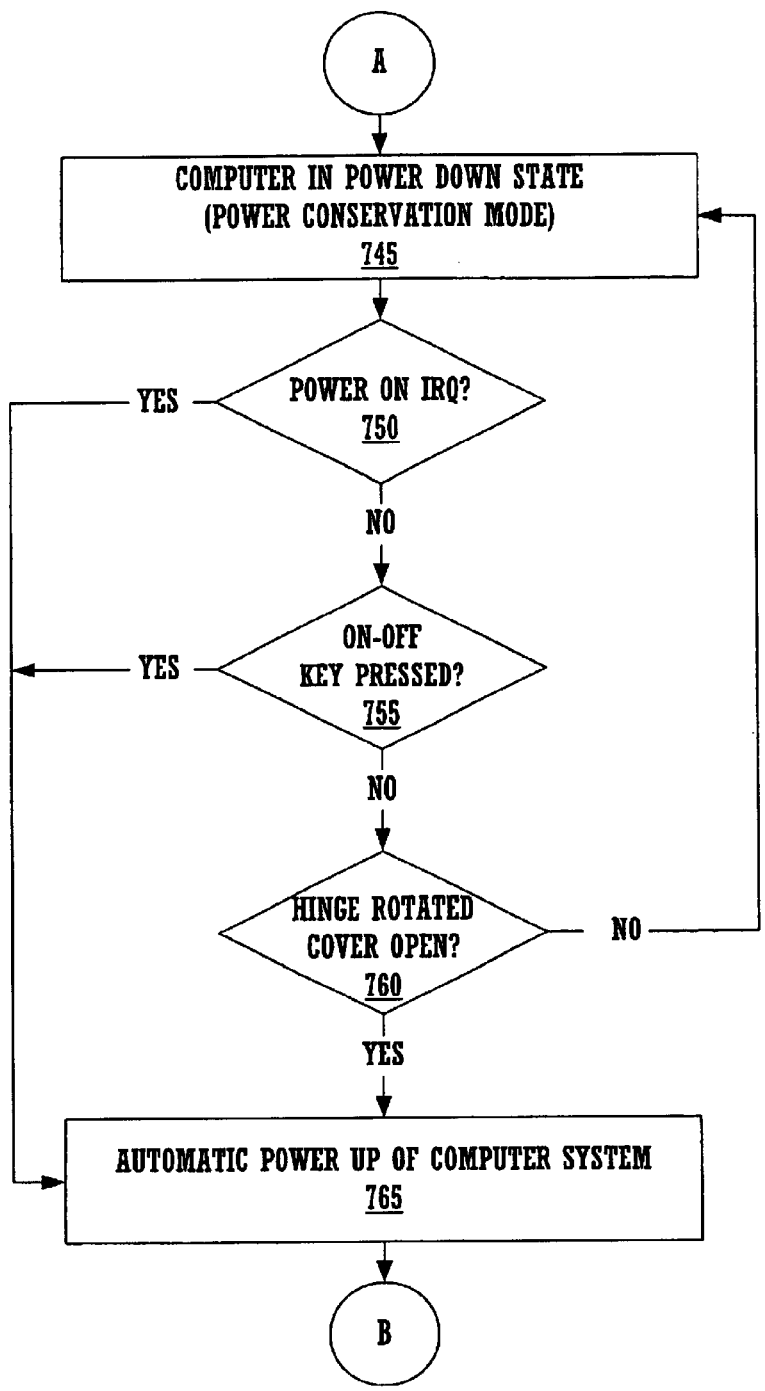
FIG. 12A and FIG. 12B are steps performed by an embodiment of the present invention for automatically powering-up and automatically powering-down a computer system based on the rotation of a hinge.
Figure 12B:
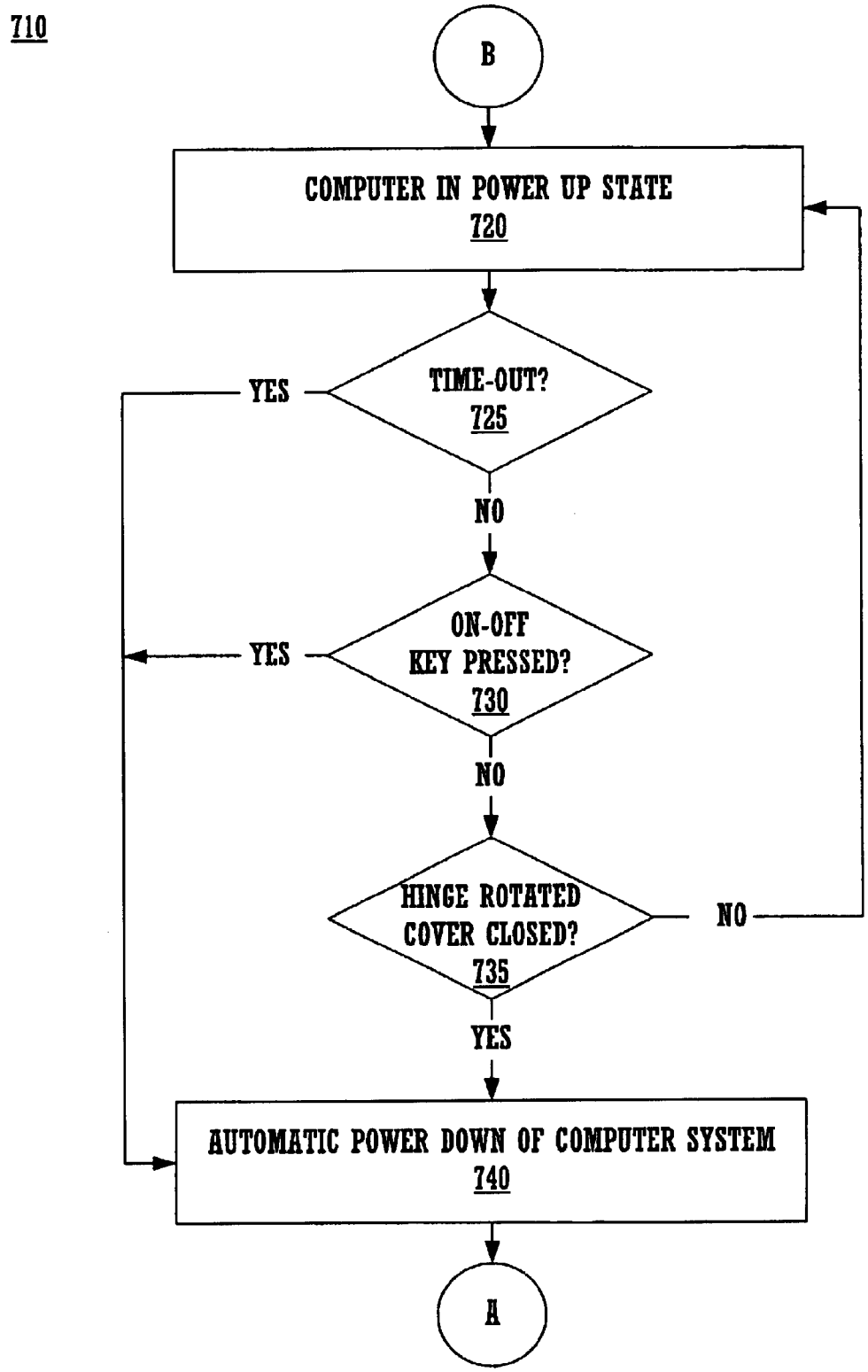

FIG. 12A and FIG. 12B illustrate the logical states of a power state machine 710 implemented in accordance with the cover and hinge embodiment of the present invention. It is appreciated that the mode signal generated at line 390 is only one piece of information that is used to either power-up or power-down the computer 100d. At state 745, the computer 100d is in the power-down state, e.g., the devices of FIG. 5, except for the RAM 102 which continuously receives power, are placed into a power conservation mode. At step 625, if an interrupt is received by the computer 100, then state 765 is entered, otherwise state 755 is entered. At step 755, if the on/off key 95 is pressed, then state 765 is entered because the computer is currently in the power-down state, otherwise step 760 is entered. At step 760, if the switch (either 410 or 375) generates a mode signal over line 390 indicating that the hinge 80 has been rotated, e.g., clockwise, such that cover 550 is removed from the display 105, then state 765 is entered, otherwise state 745 is entered.

At state 765, the computer 100d automatically is placed into the power-up state where nominal power is supplied to (consumed by) the devices of FIG. 5. At step 720 of FIG. 12B the computer remains in the power-up state. At step 725 of FIG. 12B, if a time-out occurs within computer 100d, then state 740 is entered, otherwise state 730 is entered. A time-out occurs whenever no user activity is detected by computer 100d for a predetermined period of time. At step 730, if the on/off key 95 is pressed, then state 740 is entered because the computer is currently in the power-up state, otherwise step 735 is entered. At step 735, if the switch (either 410 or 375) generates a mode signal over line 390 indicating that the hinge 80 has been rotated counter-clockwise such that cover 550 is laid over display 105 then state 740 is entered, otherwise state 720 is entered.

At state 740 of FIG. 12B, the computer 100d automatically is placed into the power-down state where the devices of FIG. 5, except for the RAM 102 device, are placed into a power conservation mode. State 745 (FIG. 9A) is then entered again.

The user typically inserts the closes the cover 550 (over display 105) when he/she is done using computer 100d and the user typically opens the cover 550, exposing display 105, when he/she is ready to use computer 100d. By using the rotational position of hinge 80 as a tool for automatically powering up and powering down computer 100d, the user does not have to press any on/off button. This embodiment of the present invention therefore reduces the number of repetitive tasks the user has to perform in order to use computer 100d.

It is appreciated that in an alternative to the cover hinge embodiment, the hinge is located between two parts of the system 100 where the system 100 actually folds in half. In this case, the cover is actually the other half of the system 100 and not merely a protective layer or surface. In this case, when the device is opened and fully extended, the hinge automatically powers up the system 100. On the other hand, when the hinge is rotated such that the device is fully retracted and folded, the hinge automatically causes the system 100 to enter the power conservation mode.

The preferred embodiment of the present invention, a method and system for automatically powering-up and automatically powering-down a computer system based on the position and/or rotation of an associated stylus, is thus described. While the present invention has been described in particular embodiments, it should be appreciated that the present invention should not be construed as limited by such embodiments, but rather construed according to the below claims.

What is claimed is:

1. A computer system comprising:
   a process coupled to a bus;
   a memory unit coupled to said bus;
   a display screen coupled to said bus;
   a digitizer coupled to said bus;
   a case for supporting said processor, said memory unit, said display screen and said digitizer, said case having a slot located therein for receiving a stylus, wherein said slot comprises an opening at one end of said slot for receiving said stylus;
   an optical detector for detecting said stylus in said slot;
   a switch coupled to said an optical detector for generating a signal to power up said processor, said display screen and said digitizer when said stylus is removed from said slot and wherein said switch is also for generating a signal to place said processor, said display screen and said digitizer into a power conservation mode when said stylus is inserted into said slot.

2. A computer system as described in claim 1 wherein said computer system is a palmtop computer system.

3. A computer system as described in claim 1 further comprising a battery, wherein said battery constantly supplies power to said memory unit but selectively supplies power to said processor, said display screen and said digitizer based on a mode of said switch.

4. A computer system as described in claim 1 and further comprising an on/off button for placing said processor, said display screen and said digitizer into said power conservation mode when pressed while said computer system is powered on and wherein said on/off button is for powering on said processor, said display screen and said digitizer when pressed while said computer system is in said power conservation mode.

5. A computer system as described in claim 1 wherein said digitizer comprises:
   a first region for capturing stroke data associated with alphabetic characters and not numeric characters; and
   a second region for capturing stroke data associated with numeric characters and not alphabetic characters.

6. A computer system as described in claim 1 wherein said digitizer is separate in area from said display screen.

7. In a computer system comprising a processor, a memory unit, a display screen and a digitizer, a method of using said computer system comprising:
   detecting electrically a user removing a stylus from a slot in a case by an electrical detector located within said slot, said case supporting said processor, said memory unit, said display screen and said digitizer, wherein said slot comprises an opening at one end of said slot for receiving said stylus;
   in response to said detecting electrically a user removing said stylus automatically placing said processor, said display screen and said digitizer in a full power-up mode to power-up said computer system;

detecting electrically a user inserting said stylus into said slot of said case by an electrical detector located within said slot;

in response to said detecting electrically a user inserting said stylus, automatically placing said processor, said display screen and said digitizer in a power conservation mode to power-down said computer system.

8. A method as described in claim 7 wherein said computer system is a palmtop computer system.

9. A method as described in claim 7 further comprising constantly supplying power to said memory unit.

10. A method as described in claim 7 wherein said computer system further comprises on/off button and further comprises:

provided said computer system is powered-up, powering-down said processor, said display screen and said digitizer when said on/off button is pressed; and provided said computer system is powered-down, powering-up said processor, said display screen and said digitizer when said on/off button is pressed.

11. A computer system comprising:

a processor coupled to a bus;

a memory unit coupled to said bus;

a display screen coupled to said bus;

a digitizer coupled to said bus;

a case for supporting said processor, said memory unit, said display screen and said digitizer, said case having a slot located therein for receiving a hinge attached to a protective cover;

an electrical detector located within said slot for detecting positions of said hinge within said slot;

a switch coupled to said an electrical detector for generating a signal to automatically power up said processor, said display screen and said digitizer when said hinge is rotated such that said cover is not laid over said display screen and wherein said switch is also for generating a signal to automatically place said processor, said display screen and said digitizer into a power conservation mode when said hinge is rotated such that said cover is laid over said display screen.

12. A computer system as described in claim 11 wherein said computer system is a palmtop computer system.

13. A computer system as described in claim 11 further comprising a battery, wherein said battery constantly supplies power to said memory unit but selectively supplies power to said processor, said display screen and said digitizer based on a mode of said switch.

14. A computer system as described in claim 11 and further comprising an on/off button for placing said processor, said display screen and said digitizer into said power conservation mode when pressed while said computer system is powered on and wherein said on/off button is for powering on said processor, said display screen and said digitizer when pressed while said computer system is in said power conservation mode.

15. A computer system as described in claim 11 wherein said digitizer comprises:

a first region for capturing stroke data associated with alphabetic characters and not numeric characters; and a second region for capturing stroke data associated with numeric alphabetic characters.

* * * * *